US006681884B2

(12) United States Patent
Shimizu et al.

(10) Patent No.: US 6,681,884 B2
(45) Date of Patent: Jan. 27, 2004

(54) POWER STEERING SYSTEM

(75) Inventors: Noboru Shimizu, Setagaya-ku (JP); Tsunefumi Arita, Kamo-gun (JP); Naoto Shima, Iwakura (JP); Masashi Takai, Seki (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/349,658

(22) Filed: Jan. 23, 2003

(65) Prior Publication Data
US 2003/0141138 A1 Jul. 31, 2003

(30) Foreign Application Priority Data
Jan. 25, 2002 (JP) ........................................ 2002-016502

(51) Int. Cl.[7] .............................................. B62D 5/065
(52) U.S. Cl. .......................................... 180/422; 701/41
(58) Field of Search ...................... 701/41, 42; 180/417, 180/422, 421, 415

(56) References Cited

U.S. PATENT DOCUMENTS

| | | | | |
|---|---|---|---|---|
| 5,279,380 A | * | 1/1994 | Frank et al. | 180/422 |
| 5,341,296 A | * | 8/1994 | Yasuno et al. | 701/70 |
| 5,343,392 A | * | 8/1994 | Ishizaka et al. | 701/29 |
| 5,487,007 A | * | 1/1996 | Suzuki et al. | 701/44 |
| 5,862,879 A | * | 1/1999 | Eberhart | 180/422 |
| 6,041,883 A | * | 3/2000 | Yokota et al. | 180/422 |
| 6,193,009 B1 | * | 2/2001 | Chino et al. | 180/441 |
| 6,499,557 B2 | * | 12/2002 | Takai et al. | 180/422 |
| 2002/0060104 A1 | * | 5/2002 | Nakazawa et al. | 180/433 |

* cited by examiner

Primary Examiner—Avraham Lerner
(74) Attorney, Agent, or Firm—Steinberg & Raskin, P.C.

(57) ABSTRACT

Provision of a power steering system which is capable of preventing a delay in response for outputting a solenoid current instruction value SI. A controller C stores a table of basic current instruction values I1 corresponding to combinations of steering angles and steering angular velocities. The controller C obtains a basic current instruction value I1 from the table, and multiplies the obtained basic current instruction value I1 by a current instruction value I2 determined on the basis of a vehicle speed, and then determines the multiplied value as a solenoid current instruction value SI.

6 Claims, 4 Drawing Sheets

POWER STEERING SYSTEM

BACKGROUND OF THE INVENTION

1. Field of the Invention

This invention relates to a power steering system including a flow control valve for the prevention of energy loss.

2. Description of Related Art

An example of power steering systems including a flow control valve for the prevention of energy loss is disclosed in Laid-open Japanese Patent Application No. 2001-163233 filed by the present applicant.

The flow control valve V of the power steering system of the prior art example includes, as shown in FIG. 3, a spool 1 having an end adjoining a pilot chamber 2 and the other end adjoining another pilot chamber 3.

The pilot chamber 2 continuously communicates with a pump P via a pump port 4. The pilot chamber 2 communicates via a flow path 6, a variable orifice a and a flow path 7 with an inflow port of a steering valve 9 provided for controlling a power cylinder 8.

The pilot chamber 3 incorporates a spring 5 and also communicates with the inflow port of the steering valve 9 via a flow path 10 and the flow path 7. Accordingly, the variable orifice a, the flow path 7 and the flow path 10 provide the communication between the pilot chambers 2 and 3. Pressure upstream from the variable orifice a acts on the pilot chamber 2, and pressure downstream therefrom acts on the pilot chamber 3. The degree of opening of the variable orifice a is controlled by a solenoid current instruction value SI for a solenoid SOL.

The spool 1 keeps a position at which the force acting on the pilot chamber 2, the force acting on the pilot chamber 3, and the force of the spring 5 are in balance. This balanced position determines the degree of opening of both the pump port 4 and tank port 11.

For example, upon actuation of a pump driving source 12 such as an engine or the like, the pump P is driven to supply pressure oil into the pump port 4 to cause a flow in the variable orifice a. This flow produces a pressure difference between the two sides of the variable orifice a, and the pressure difference causes a difference in pressure between the pilot chambers 2 and 3. The resultant pressure difference moves the spool 1 from the normal position, illustrated in FIG. 3, to the balanced position with opposing a force of the spring 5.

Thus, moving the spool 1 from the normal position toward the balanced position increases the degree of opening of the tank port 11. In accordance with the resulting degree of opening of the tank port 11, the distribution ratio between a control flow QP introduced toward the steering valve 9 from the pump P and a return flow QT circulating back to the tank T or the pump P is determined. In other words, the control flow QP is determined in accordance with the degree of opening of the tank port 11.

The control of the control flow QP in accordance with the degree of opening of the tank port 11 as described above results in determination of the control flow QP in accordance with the degree of opening of the variable orifice a. This is because the position to which the spool 1 is shifted, which determines the degree of opening of the tank port 11, is determined by the differential pressure between the two pilot chambers 2 and 3, and this differential pressure is determined by the degree of opening of the variable orifice a.

Thus, in order to control the control flow QP in accordance with the vehicle speed or the steering condition of the vehicle, the degree of opening of the variable orifice a, or the solenoid current instruction value SI for the solenoid SOL may be controlled. This is because the degree of opening of the variable orifice a is controlled in proportion to an excitation current of the solenoid SOL so that the variable orifice a holds the degree of its opening to a minimum in the non-excited state of the solenoid SOL and increases the degree of its opening as the excitation current is increased.

The steering valve 9 applied with the control flow QP controls the amount of oil supplied to the power cylinder 8 in accordance with input torque (steering torque) of the steering wheel (not shown). For example, if the steering torque is large, the amount of shifting of the steering valve 9 is increased to increase the amount of oil supplied to the power cylinder 8, whereas if it is small, the amount of shifting of the steering valve 9 is decreased to decrease the amount of oil supplied to the power cylinder 8. The higher the amount of supply of pressure oil, the higher the assist force the power cylinder 8 exerts. The smaller the amount of supply, the lower the assist force the power cylinder 8 exerts.

It should be noted that the steering torque and the amount of shifting of the steering valve 9 are determined by a torsion reaction of a torsion bar (not shown) or the like.

As described above, the steering valve 9 controls the flow QM supplied to the power cylinder 8 and the flow control valve V controls the control flow QP supplied to the steering valve 9. If the flow QM required by the power cylinder 8 comes as close as possible to the control flow QP determined by the flow control valve V, it is possible to reduce the energy loss around the pump P. This is because the energy loss around the pump P is caused by a difference between the control flow QP and the flow QM required by the power cylinder 8.

In order to make the control flow QP as close as possible to the flow QM required by the power cylinder 8 for the prevention of energy loss, the system of the prior art example controls the degree of opening of the variable orifice a. The degree of opening of the variable orifice a is determined by the solenoid current instruction value SI for the solenoid SOL as described earlier. The solenoid current instruction value SI is controlled by a controller C which will be described in detail next.

The controller C is connected to a steering angle sensor 14 and a vehicle speed sensor 15. As illustrated in FIG. 4, the controller C determines a current instruction value $I\theta$ on the basis of a steering angle detected by the steering angle sensor 14, and also a current instruction value $I\omega$ on the basis of a steering angular velocity calculated by differentiating the steering angle.

The relationship between the steering angle and the current instruction value $I\theta$ is determined on the basis of theoretical values giving linear characteristics to the relationship between the steering angle and the control flow QP. The relationship between the steering angular velocity and the current instruction value $I\omega$ is also determined on the basis of theoretical values giving linear characteristics to the relationship between the steering angular velocity and the control flow QP. It should be noted that the current instruction values $I\theta$ and $I\omega$ outputted are zero unless both the steering angle and the steering angular velocity exceed a set value. Specifically, when the steering wheel is positioned at or around the center, the current instruction values $I\theta$ and $I\omega$ are outputted at zero in order to set a dead zone around the center.

After the determination of each of the current instruction values $I\theta$ and $I\omega$ as described above, the determined values Iθ and Iω are added together. The reasons for the addition of the current instruction values Iθ and Iω together are as follows.

The first reason is ensuring of response. The power cylinder 8 has a good response whenever the control rate QM supplied is higher than the flow QM required in the power cylinder 8 or the steering valve 9. For this reason, the current instruction value Iθ is added to the current instruction value Iω.

The second reason is ensuring of stability in steering. Steering torque is suitable for use in estimation of the required flow QM in the steering valve 9. However, the use of the steering torque requires an extensive change in the condition of the existing systems. Hence, the prior art system uses a steering angular velocity ω which is most closely approximate to steering torque. Inconveniently the steering angular velocity ω is produced only during the operation of the steering wheel. For example, when the steering wheel is rotated at a given angle and held at this angle, the steering angular velocity ω is zero. If the control flow QP is not ensured in such a steering operation, there is a need to increase the steering force with respect to self-aligning torque of the vehicle or an external force.

However, if a steering angle θ is specified as a parameter as described earlier, it is possible to obtain the current instruction value Iθ because the steering angle θ is maintained even during the steering operation. Thus, a power required for steering is maintained by the current instruction value Iθ.

After the addition of the current instruction values Iθ and Iω as described earlier, the result (Iθ+Iω) is multiplied by a current instruction value Iv that is set on the basis of a vehicle speed. The current instruction value Iv based on the vehicle speed is outputted at one when the vehicle speed is low and at zero when the vehicle speed is high, and further at any value of decimal places between one and zero when the vehicle is driven at medium speeds between low and high. Specifically, the added value (Iθ+Iω) is outputted without change when the vehicle speed is low, and the value of (Iθ+Iω) results in zero when it is high. Further, when the vehicle speed is medium, with an increase in the vehicle speed, a value inversely proportional to the increased speed is outputted.

The reason for control of the output according to the vehicle speed in this way is that usually the steering wheel is not rotated much when driving at high speeds but is largely rotated when driving at low speeds. In other words, when driving at a high speed, there is little need for an assist force and the exertion of an excessive assist force poses a danger. In many cases, an assist force is required when the vehicle is driven at low speeds. For these reasons, the output is controlled in accordance with the vehicle speed.

Next, a standby current instruction value Is is added to the value of (Iθ+Iω)×Iv determined in the above manner. Then the value resulting from (Iθ+Iω)×Iv+Is is output as a solenoid current instruction value SI to the driver 16 illustrated in FIG. 3.

Because of the addition of the standby current instruction value Is, the solenoid current instruction value SI is maintained at a predetermined magnitude even when all of the current instruction values based on the steering angle, the steering angular velocity and the vehicle speed are zero. This fact leads to the supply of a predetermined oil flow to the steering valve 9 at all times. However, in terms of the prevention of energy loss, the control flow QP in the flow control valve V becomes ideally zero when the flow QM required by the power cylinder 8 and steering valve 9 is zero. Specifically, reducing the control flow QP to zero means causing the total amount of oil discharged from the pump P to return from the tank port 11 to the pump P or the tank T. The path of oil flow returning from the tank port 11 to the pump P or tank T is extremely short in the body, so that little pressure loss occurs. Due to little pressure loss, the driving torque for the pump P is lessened to a minimum, leading to energy conservation. In this context, the fact that the control flow QP becomes zero when the required flow QM is zero is advantageous in terms of the prevention of energy loss.

Nevertheless, a standby flow QS is maintained even when the required flow QM is zero. This is because of the following.

(1) Prevention of seizure in the system. The circulation of the standby flow QS through the system can provide cooling effects.

(2) Ensuring of response. The maintenance of the standby flow QS results in a reduction of the time required for attaining a target control flow QP as compared with the case of no maintenance of the standby flow QS. The resulting time difference affects the response. As a result, the maintenance of the standby flow QS leads to improvement in the response.

0018

(3) Countering disturbances, such as kickback and the like, and self-aligning torque. Reaction to self-aligning torque or disturbance acts on the wheels, which then acts on the rod of the power cylinder 8. If the standby flow is not maintained, the reaction to the self-aligning torque or the disturbance makes the wheels unsteady. However, the maintenance of the standby flow prevents the wheels from becoming unsteady even when the reaction acts on the wheels. Specifically, the rod of the power cylinder 8 engages with a pinion for switching the steering valve 9, and the like. Hence, upon the action of the reaction, the steering valve is also switched to supply the standby flow in a direction counter to the reaction. Therefore, maintaining the standby flow makes it possible to counter the self-aligning torque and the disturbance caused by kickback.

Next, a description will be given of the operation of the power steering system of the prior art example.

For example, if the vehicle is steered when travelling at low speeds, the steering angle at this point determines a current instruction value Iθ, and the steering angular velocity determines a current instruction value Iω. The determined current instruction values Iθ and Iω are added together. Then, the added value (Iθ+Iω) is multiplied by a current instruction value Iv according to the vehicle speed. At this point, the current instruction value Iv to be multiplied is one because the vehicle speed is low. Then a current instruction value Is for ensuring a standby flow is added to the multiplied value (Iθ+Iω).

In short, in the case of low speeds, a solenoid current instruction value SI results in SI=Iθ+Iω+Is, and a control flow Q corresponding to the resulting value is supplied to the steering valve 9.

When the vehicle speed is medium, a current instruction value Iv becomes smaller than one as the vehicle speed is increased. Therefore, a value multiplied by the current instruction value Iv also becomes smaller, resulting in a small solenoid-current-instruction value SI. Consequently, in the case of medium speeds, a control flow QP decreases in accordance with a vehicle speed so that the driver needs large steering torque.

When the vehicle speed becomes high, the current instruction value Iv becomes zero. When the current instruction value Iv is zero, this gives (Iθ+Iω))×Iv=0. As a result, the control flow QP becomes only the standby flow QS, so that a large steering torque is required for a steering operation. It should be noted that there is no problem because the steering wheel is not turned when driving at high speeds. Further, an extremely large assist force is prevented from being exerted for the enhancement of safety when driving at high speeds.

When the steering wheel is held around the central position when travelling in a straight line or the like, the current instruction value Iθ based on the steering angle and the current instruction value Iω based on the steering angular velocity are zero. However, in this case, only the standby current instruction value Is is outputted to infallibly maintain the standby flow. Therefore, even when the steering wheel is held around the central position, the system is capable of maintaining the response and countering any disturbance.

The spool 1 has a slit 13 formed at its leading end. Even when the spool 1 is in the normal position illustrated in FIG. 3, the slit 13 establishes communication between the pilot chamber 2 and the variable orifice a. Specifically, even when the spool 1 is in the normal position, the pressure oil which has been supplied from the pump port 4 to the pilot chamber 2 is supplied through the slit 13, flow path 6, variable orifice a and then flow path 7 to the steering valve 9. Due to such supply of the pressure oil, the system successfully achieves the prevention of seizure and disturbances such as kickback or the like, and the ensured response.

Further FIG. 3 illustrates a driver 16 provided for driving the solenoid SOL and connected to the controller C and the solenoid SOL, throttles 17 and 18, and a relief valve 19.

With the prior art power steering system as described above, in order to find the solenoid current instruction value SI, the current instruction values Iθ and Iω are added together and then multiplied by the current instruction value Iv based on the vehicle speed signal Sv. This computation processing requires much time, which gives rise to the problem of a delay in the response for outputting the solenoid current instruction value SI.

SUMMARY OF THE INVENTION

It is an object of the present invention to provide a power steering system which is capable of preventing output of a solenoid current instruction value SI from suffering a delay in response.

A first feature of the present invention provides a power steering system comprising a steering valve for controlling a power cylinder; a variable orifice provided upstream from the steering valve; a solenoid for controlling a degree of opening of the variable orifice; a controller for controlling a solenoid current instruction value SI used for driving the solenoid; a steering angle sensor and a vehicle speed sensor which are connected to the controller; and a flow control valve for distributing a flow supplied from a pump, to a control flow supplied to the steering valve in accordance with the degree of opening of the variable orifice, and a return flow circulating back to a tank or the pump, in which the controller stores a table of basic current instruction values I1 corresponding to combinations of steering angles and steering angular velocities, and multiplies the basic current instruction value I1, obtained from the table, by a current instruction value I2 set on the basis of a vehicle speed for determination of the solenoid current instruction value SI.

A second feature of the present invention provides a power steering system comprising a steering valve for controlling a power cylinder; a variable orifice provided upstream from the steering valve; a solenoid for controlling a degree of opening of the variable orifice; a controller for controlling a solenoid current instruction value SI used for driving the solenoid; a steering angle sensor and a vehicle speed sensor which are connected to the controller; and a flow control valve for distributing a flow supplied from a pump, to a control flow supplied to the steering valve in accordance with the degree of opening of the variable orifice, and a return flow circulating back to a tank or the pump, in which the controller stores a table of basic current instruction values I1 corresponding to combinations of steering angles and steering angular velocities, and provides the basic current instruction value I1, obtained from the table, with a current instruction value I2 based on a vehicle speed as a limit value, and determines the value below the limit value as the solenoid current instruction value SI.

A third feature of the present invention is that, in the first or second feature, the controller adds a standby current instruction value Is to the basic current instruction value I1 for determination of the solenoid current instruction value SI.

A fourth feature of the present invention is that, in the third feature, the standby current instruction value Is is multiplied by a current instruction value I3 set on the basis of the vehicle speed.

According to the first and second features, the controller stores in table form the basic current instruction values I1 each corresponding to a combination of the steering angle and the steering angular velocity, and obtains the basic current instruction value from the table. Therefore, as compared with the prior art requiring the computation processing as described in FIGS. 3 and 4, the processing speed of the controller is faster. Due to the increased processing speed, the response for outputting the solenoid current instruction value SI is enhanced.

According to the third feature, even when the driver holds the steering wheel, a constant standby flow is supplied to the power steering system because of the standby current instruction value Is added to the basic current instruction value I1. Hence, the present invention provides the advantages that the power steering system is prevented from seizing up, ensures the response when the steering operation is started, and counters the self-aligning torque and disturbances such as kickback or the like.

According to the fourth feature, the standby flow is controllable on the basis of the vehicle speed. Therefore, the present invention allows prevention of a needless standby flow at high vehicle speeds.

DETAILED DESCRIPTION OF THE PREFERRED EMBODIMENTS

Figure 1:
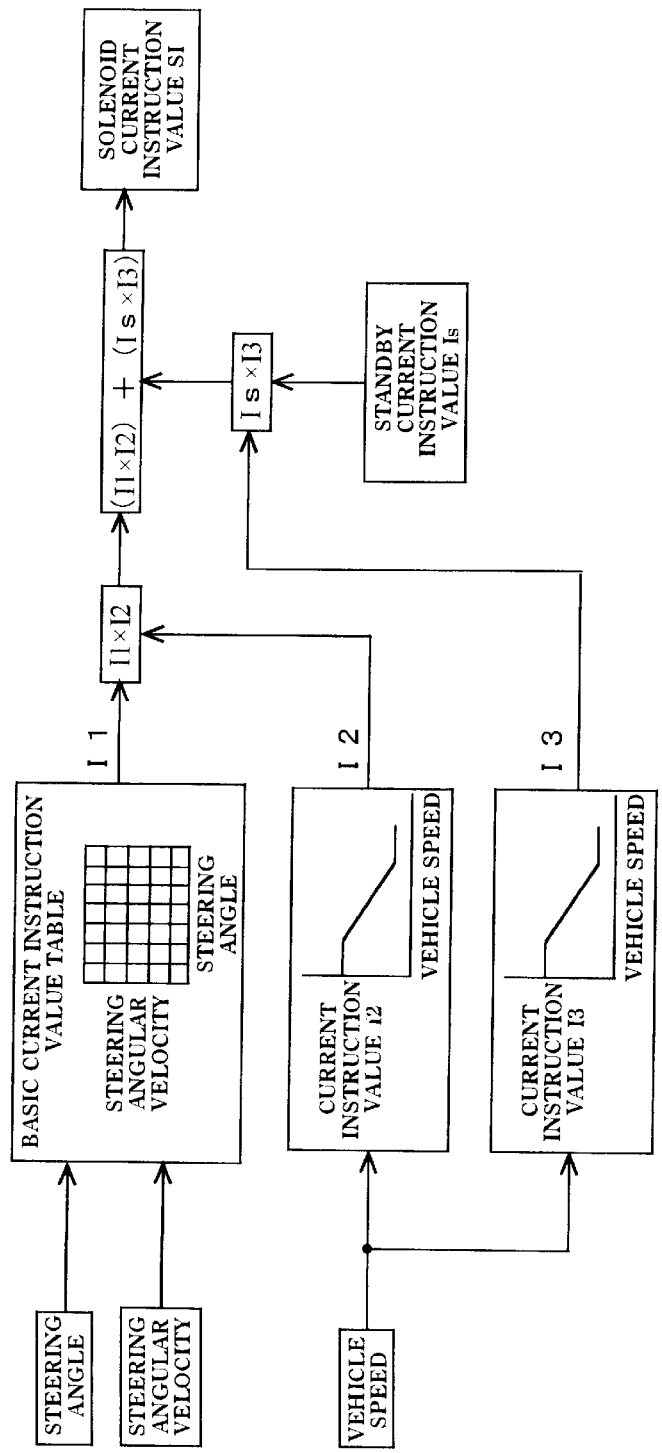
FIG. 1 is a diagram for illustrating a control system of a controller C in a first embodiment.
Figure 3:
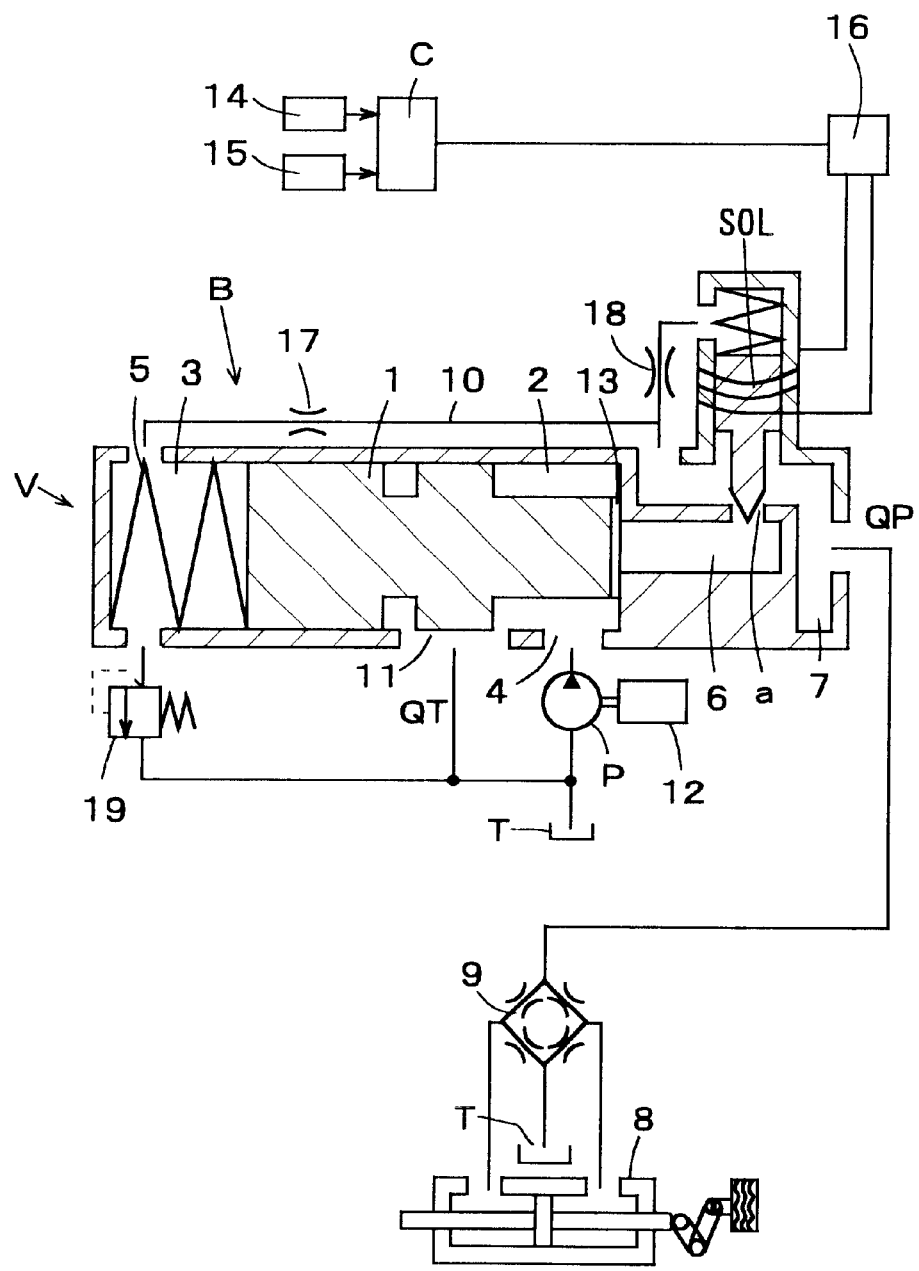
FIG. 3 is a general diagram illustrating a power steering system in the prior art.
Figure 4:
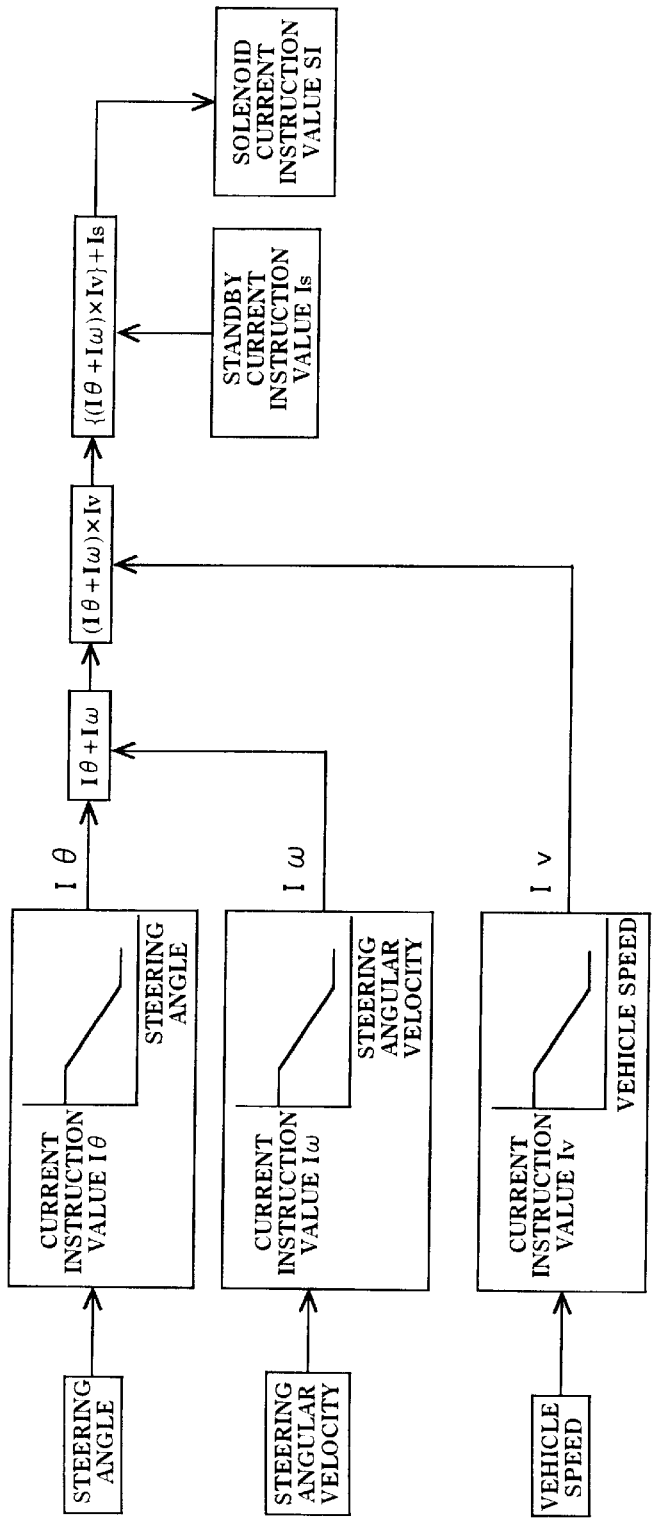
FIG. 4 is a diagram illustrating a control system of a controller C of the prior art.

FIG. 1 illustrates a control system of a controller C of a first embodiment according to the present invention. In the case of the first embodiment, the power steering system has the same configuration including the flow control valve V, the power cylinder 8, the steering valve 9 and so on illustrated in FIG. 3, exclusive of the controller C, as that of the prior art example which has been described earlier in FIG. 3, and the main description will now be given of the control system of the controller C.

As illustrated in FIG. 1, the controller C stores a table of basic current instruction values I1 corresponding to the combination of steering angles and steering angular velocities. The table shows a list of values resulting from the additions of current instruction values Iθ based on the steering angles and current instruction values Iω based on the steering angular velocities. Upon reception of the input of a steering angle detected by the steering angle sensor 14, the controller C finds from the table a basic current instruction value Id corresponding to the detected steering angle and a steering angular velocity obtained by differentiating the steering angle.

Whenever the prior art controller C receives the input of the steering angle from the steering angle sensor 14, it performs the addition of the steering angle signal Iθ based on the steering angle and the steering angular velocity signal Iω based on the steering angular velocity. However, the first embodiment does not perform such an addition but selects an applicable basic current instruction value I1 from the table. Consequently, the processing speed of the controller is increased by a reduction in the time required for the computation processing.

After the above determination of the basic current instruction value I1 from the table, the controller C multiplies the basic current instruction value I1 by a current instruction value I2 set on the basis of a vehicle speed. The multiplication by the current instruction value I2 based on the vehicle speed is performed for controlling the output in accordance with the vehicle speed as in the example of the prior art.

After the above determination of (I1×I2), the controller C adds a standby current instruction value to the determined value. In the present invention, the standby current instruction value is not added directly. That is, the value to be added is a value (Is×I3) resulting from the multiplication of the standby current instruction value Is by a current instruction value I3 set on the basis of the vehicle speed.

The reason for multiplying the standby current instruction value Is by the current instruction value I3 based on the vehicle speed is as follows.

As described earlier, the standby current instruction value Is is provided for the three functions of preventing the system from seizing up, ensuring the response, and countering the self-aligning torque and disturbances such as kickback or the like. The response is especially needed when the vehicle is driven at low speeds but is not needed so much when it is driven at high speeds. This is because the steering becomes unstable when the response is extremely fast during high-speed travel.

Since the standby current instruction value is fixed in the prior art, the standby flow is set with reference to the response at low vehicle speeds. Hence the prior art has the problem that the standby flow is needless during high-speed travel.

In order to prevent such a needless standby flow, the first embodiment provides for the multiplication of the standby current instruction value Is by the current instruction value I3 based on the vehicle speed. The current instruction value I3 based on the vehicle speed is outputted at one when the vehicle is driven at low speeds. At medium vehicle speeds, the output of the value I3 decreases gradually with the increase in the vehicle speed. When the vehicle reaches a high speed, the output of the value I3 is kept to a minimum. Accordingly, the value resulting from the multiplication of the standby current instruction value Is by the current instruction value I3 based on the vehicle speed is outputted without change at low vehicle speeds, and is decreased gradually from medium vehicle speeds toward high vehicle speeds. Then, the value (Is×I3) is kept to a minimum at high vehicle speeds. This design allows the prevention of a needless standby flow.

The multiplication of the standby current instruction value Is by the current instruction value I3 does not results in zero even at high vehicle speeds.

After the above determination of the value (I1×I2)+(Is×I3), the controller C outputs the determined value as a solenoid current instruction value SI to the driver 16. Then the driver 16 outputs an excitation current corresponding to the solenoid current instruction value SI to the solenoid SOL.

According to the first embodiment, the controller C finds the basic current instruction value I1 corresponding to the steering angle and the steering angular velocity from the table stored therein. Hence, the processing speed of the controller is faster as compared with the prior art example performing the addition of the steering angle signal Iθ and the steering angular velocity Iω. Due to the increased processing speed, the response for outputting the solenoid current instruction value SI is enhanced.

Figure 2:
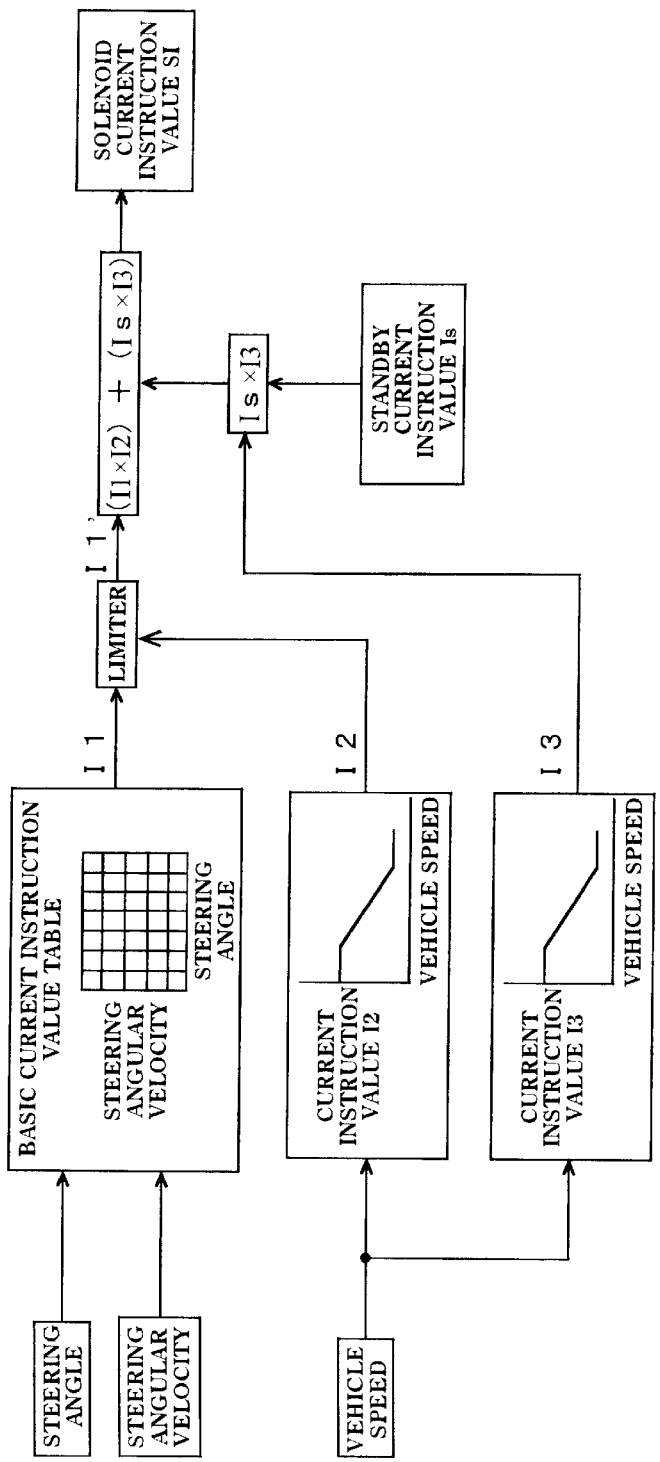
FIG. 2 is a diagram for illustrating a control system of a controller C in a second embodiment.

A second embodiment illustrated in FIG. 2 determines a current instruction value I2 on the basis of a vehicle speed for use as a limit value. Other configuration in the second embodiment is the same as that in the first embodiment.

The current instruction value I2 based on the vehicle speed is used as the limit value in the second embodiment. The limit value based on the vehicle speed is constantly maintained at a maximum when the vehicle speed is low, and at a minimum when the vehicle speed is high. At medium vehicle speeds, the limit value decreases gradually in accordance with the vehicle speed. Accordingly, for example, when the basic current instruction value I1 is larger than a limit value based on the vehicle speed, the controller C outputs the limit value as a current instruction value I1'. When the basic current instruction value I1 is smaller than the limit value, the controller C outputs the basic current instruction value I1 as the current instruction value I1' directly.

Due to the limit value set as described above, even if the steering wheel is abruptly rotated during high-speed travel, the safety can be adequately ensured.

After the determination of the current instruction value I1', the controller C performs an addition of the current instruction value I1' and the value resulting from the multiplication of the standby current instruction value Is by the current instruction value I3 based on the vehicle speed. Then the controller C outputs the value of I1'+(Is×I3) as the solenoid current instruction value SI to the driver 16. Then the driver 16 outputs an excitation current corresponding to the solenoid current instruction value SI to the solenoid SOL.

According to the second embodiment, the controller C finds the basic current instruction value I1 corresponding to the steering angle and the steering angular velocity from the table stored in the controller. Hence, as compared with the example of the prior art performing the addition of the steering angle signal Iθ and the steering angular velocity Iω, a processing speed of the controller C is faster, leading to the enhancement in the response for outputting the solenoid current instruction value SI.

The standby current instruction value Is is added in the first and second embodiments. However, the present invention does not necessarily require the addition of the standby current instruction value Is. Further regarding the multiplication of the standby current instruction value Is by the current instruction value I3 based on the vehicle speed, the present invention also does not necessarily require the multiplication of the current instruction value I3.

Further, in the first and second embodiments, the steering angular velocity is calculated by differentiation of the steering angle. However, a steering angular velocity sensor may be additionally mounted for detection of the current instruction value Iω.

We claim:

1. A power steering system, characterised by:
   a steering valve (9) for controlling a power cylinder (8);
   a variable orifice (a) provided upstream from the steering valve (9);
   a solenoid (SOL) for controlling a degree of opening of the variable orifice (a);
   a controller (C) for controlling a solenoid current instruction value (SI) used for driving the solenoid (SOL);
   a steering angle sensor (14) and a vehicle speed sensor (15) which are connected to the controller (C); and
   a flow control valve (V) for distributing a flow supplied from a pump (P), to a control flow supplied to the steering valve (9) in accordance with the degree of opening of the variable orifice (a), and a return flow circulating back to a tank (T) or the pump (P), and
   in that the controller (C) stores a table of basic current instruction values (I1) corresponding to combinations of steering angles and steering angular velocities, and multiplies the basic current instruction value (I1), obtained from the table, by a current instruction value (I2) set on the basis of a vehicle speed for determination of the solenoid current instruction value (SI).

2. A power steering system according to claim 1, characterised in that the controller (C) adds a standby current instruction value (Is) to the basic current instruction value (I1) for determination of the solenoid current instruction value (SI).

3. A power steering system according to claim 2, characterised in that the standby current instruction value (Is) is multiplied by a current instruction value (I3) set on the basis of the vehicle speed.

4. A power steering system, characterised by:
   a steering valve (9) for controlling a power cylinder (8);
   a variable orifice (a) provided upstream from the steering valve (9);
   a solenoid (SOL) for controlling a degree of opening of the variable orifice (a);
   a controller (C) for controlling a solenoid current instruction value (SI) used for driving the solenoid (SOL);
   a steering angle sensor (14) and a vehicle speed sensor (15) which are connected to the controller (C); and
   a flow control valve (V) for distributing a flow supplied from a pump (P), to a control flow supplied to the steering valve (9) in accordance with the degree of opening of the variable orifice (a), and a return flow circulating back to a tank (T) or the pump (P), and
   in that the controller (C) stores a table of basic current instruction values (I1) corresponding to combinations of steering angles and steering angular velocities, and provides the basic current instruction value (I1), obtained from the table, with a current instruction value (I2) based on a vehicle speed as a limit value, and determines a value below the limit value as the solenoid current instruction value (SI).

5. A power steering system according to claim 4, characterised in that the controller (C) adds a standby current instruction value (Is) to the basic current instruction value (I1) for determination of the solenoid current instruction value (SI).

6. A power steering system according to claim 5, characterised in that the standby current instruction value (Is) is multiplied by a current instruction value (I3) set on the basis of the vehicle speed.

* * * * *